United States Patent [19]

Hinoshita et al.

[11] 3,840,698

[45] Oct. 8, 1974

[54] VIDEO SIGNAL TRANSMISSION SYSTEM

[75] Inventors: Shigehiko Hinoshita, Yokohama; Yukihiko Minejima, Kawasaki; Takao Moriya, Yamato, all of Japan

[73] Assignee: Fujitsu Limited, Kawasaki, Japan

[22] Filed: July 17, 1973

[21] Appl. No.: 380,105

[30] Foreign Application Priority Data

July 19, 1972 Japan ............................... 47-71597

[52] U.S. Cl. ............................ 178/6.8, 178/DIG. 3

[51] Int. Cl. ............................................ H04n 7/12

[58] Field of Search .................... 178/6, 6.8, DIG. 3; 179/15 BW, 15.55; 325/38 R, 38 A, 38 B

[56] References Cited

UNITED STATES PATENTS

| | | | |
|---|---|---|---|
| 3,739,091 | 6/1973 | Kurasawa | 178/DIG. 3 |
| 3,761,613 | 9/1973 | Limb | 178/DIG. 3 |

*Primary Examiner*—Howard W. Britton
*Attorney, Agent, or Firm*—Staas, Halsey & Gable

[57] ABSTRACT

A picture transmission system for transmitting a video signal of compressed bandwidth, in which the transmitting station is provided with: means for dividing a picture to be transmitted into a plurality of blocks and regularly scanning and extracting video signals at corresponding sampling points in the respective blocks in a predetermined order; a frame memory for storing video signals of one frame; means for comparing picture elements of the video signals from the scanning and extracting means with those at the corresponding sampling points of the video signal obtained by a preceding scanning and stored in the frame memory and for selecting the block of the video signal of the largest level difference; and means supplied with the output from the selecting means to add the picture element of video signal of the corresponding block with a signal indicating the block and transmitting such signals over a transmission line or medium; and in which the receiving station is provided with a frame memory for storing video signals of one frame; and detecting means for detecting the block indicating signal added to the picture element of video signal transmitted and converting a picture element of video signal in the block of a picture in the frame memory corresponding to the block indicating signal into the picture element of video signal transmitted.

8 Claims, 11 Drawing Figures

VIDEO SIGNAL TRANSMISSION SYSTEM

BACKGROUND OF THE INVENTION

1. Field of the Invention

This invention relates to a picture transmission system, and more particularly to improvements in or relating to a picture transmission system capable of bandwidth compression.

2. Description of the Prior Art

Since a video signal of a relatively stationary picture as in picturephony or the like has the close relationship between signals of adjacent frames, enhancement of the efficiency of transmission such as reduction of transmission bandwidth and shortening of the transmission time and so on can be attained by redundancy compression, utilizing the close relationship of the signals between the frames. One known transmission system of high efficiency, which is of the type utilizing the relationship between the signals of adjacent frames, is a kind of conditional picture element replenishiment system (such, for example, as disclosed in Bell Laboratories Record, page 110, April 1970). In accordance with this known system, video signals of one frame are stored in a memory (hereinafter referred to as a frame memory). When video signals of the next frame are transmitted, they are each compared with the video signals of the preceding frame previously stored which correspond in position to them. The amplitude values of only those signals which have varied from the preceding ones corresponding hereto or whose variations exceed a certain threshold value, are transmitted together with address signals indicating their positions. On the receiving side, only those areas having varied are rewritten by a similar memory as indicated on the transmitting side. In this case, substantially no transmission signal exists in the stationary picture area but transmission signals center on the moving picture area and, in addition, they are produced irregularly in accordance with the motion of an object being televised. Therefore, in order to transmit them over a transmission line having a constant transmission capacity, it is necessary to smooth the sending of the transmission signals by the employment of a buffer memory of appreciably large capacity, introducing complexity in the construction of apparatus. However, this system has an advantage that the bandwidth compression ratio is relatively large.

The so-called regular replenishment system, in which only those areas of each frame having varied are rewritten in accordance with a pattern (for example, a checker board pattern of the frame memory determined to be rewritten and all picture elements of the frame memory are rewritten by the use of a plurality of frames to produce a new picture, is also known (for example, Bell System Technical Journal, page 167, January 1967). This system is advantageous in that the apparatus therefor is simple in construction but defective in that deterioration is caused particularly in the moving picture area, making it impossible to obtain a high compression ratio.

SUMMARY OF THE INVENTION

An object of this invention is to provide a picture transmission system which is free from the aforesaid defects experienced in the prior art and which is relatively simple in construction but capable of realizing bandwidth compression with less deterioration by a combination of the aforesaid conditional picture element replenishment system and regular replenishment system, based on the special property of the picture transmitted picturephony and the like.

The picture transmission system of this invention is characterized in that the picture is divided into a plurality of blocks (N's blocks); signals, each corresponding to one sampling point of each block, are regularly extracted in an order determined so that a moving picture area does not relatively overlap the sampling points; and that signal of the plurality of sampling point signals whose level difference between it and a sampling point signal corresponding to the same sampling point, obtained by the preceding scanning, is larger than those of the others, is selected and transmitted together with an address signal indicating the block of the transmitted signal, thereby providing a bandwidth compression ratio substantially 1/N.

This invention will be more readily understood by reference to the following detailed description and to the accompanying drawings.

BRIEF DESCRIPTION OF THE DRAWINGS

The accompanying sheets of drawings illustrate one example of a transmission system of this invention, in which.

DESCRIPTION OF THE PREFERRED EMBODIMENTS

With reference to the drawings, the present invention will hereinafter be described in detail.

Figure 1:
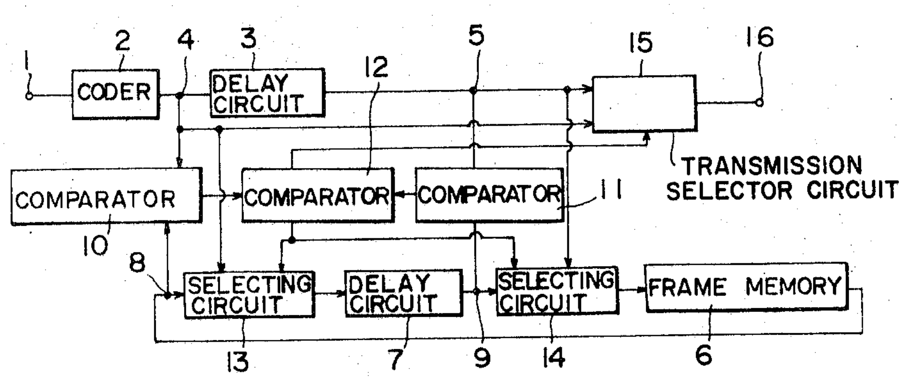
FIG. 1 is a block diagram showing the transmitting station of this invention.
Figure 2:
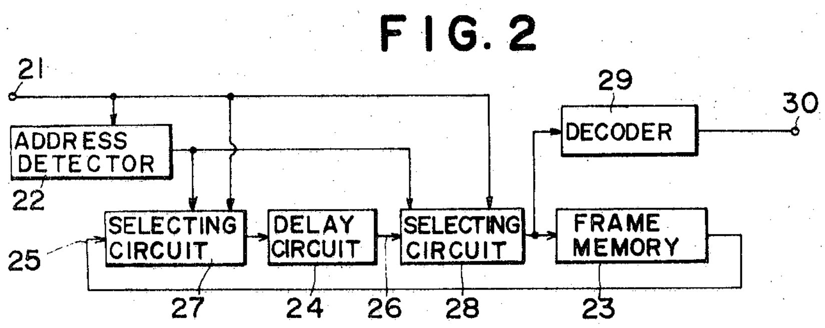
FIG. 2 is a block diagram illustrating the receiving station of this invention.

FIG. 1 illustrates in block form a transmitting station of one example of this invention. In FIG. 1, reference numeral 1 indicates an input terminal; 2 refers to a coder; 3 and 7 identify delay circuits; 6 indicates a frame memory: 10, 11 and 12 relate to comparators; 13 and 14 refers to selecting circuits; 15 identifies a transmission selector circuit; and 16 refers to an output terminal. FIG. 2 shows a receiving station, which will be described later on.

Figure 3:
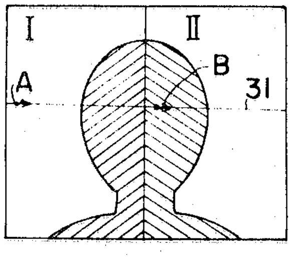
FIGS. 3 and 4 are diagrams, for explaining the operation of this invention.

In the transmitting station as seen in FIG. 1, a video signal to be transmitted, which is applied to the input terminal 1, is converted by the coder 2 into a digital signal which is convenient to be processed and stored at a subsequent stage. The digital signal thus obtained is supplied to the delay circuit 3 having a delay time which is about one-half the horizontal scanning period. Consequently, there appear at both ends 4 and 5 of the delay circuit 3 amplitude values of picture elements of the video signal which correspond to two points, for example, A and B, lying on one horizontal scanning line in a picture and spaced apart a distance about one-half the lateral width of the picture, as shown in FIG. 3. In practice, the distance therebetween is a little longer than the above because of a blanking period. The picture elements move in the direction of the horizontal scanning line with the lapse of time while being spaced apart the same distance. While, the delay time of a loop including the frame memory 6 and the delay circuit 7 similar to the delay circuit 3, is selected to be just one frame period and, at both ends of the delay circuit 7, amplitude values at the points B and A of the video signal corresponding to the preceding frame appear similarly. These signals are compared by the comparators 10 and 11 with the previous ones to detect the differences therebetween respectively and the differences thus obtained are compared by the comparator 12 to detect the difference therebetween, which is applied to the selecting circuit 13 or 14 and the transmission selector circuit 15. As a result of this, either one of the selecting circuits 13 and 14 of the frame memory 6 operates to rewrite the signal of larger variation to prepare for the operation for the next frame. The transmission selector 15 selects either one of the signals at the output side 5 and the input side 4 of the delay circuit 3 whose variation is larger than the other, and sends out the selected signal from its output terminal together with a one-bit address code indicating the block (I or II in FIG. 3) to which the selected signal belongs.

Figure 5:
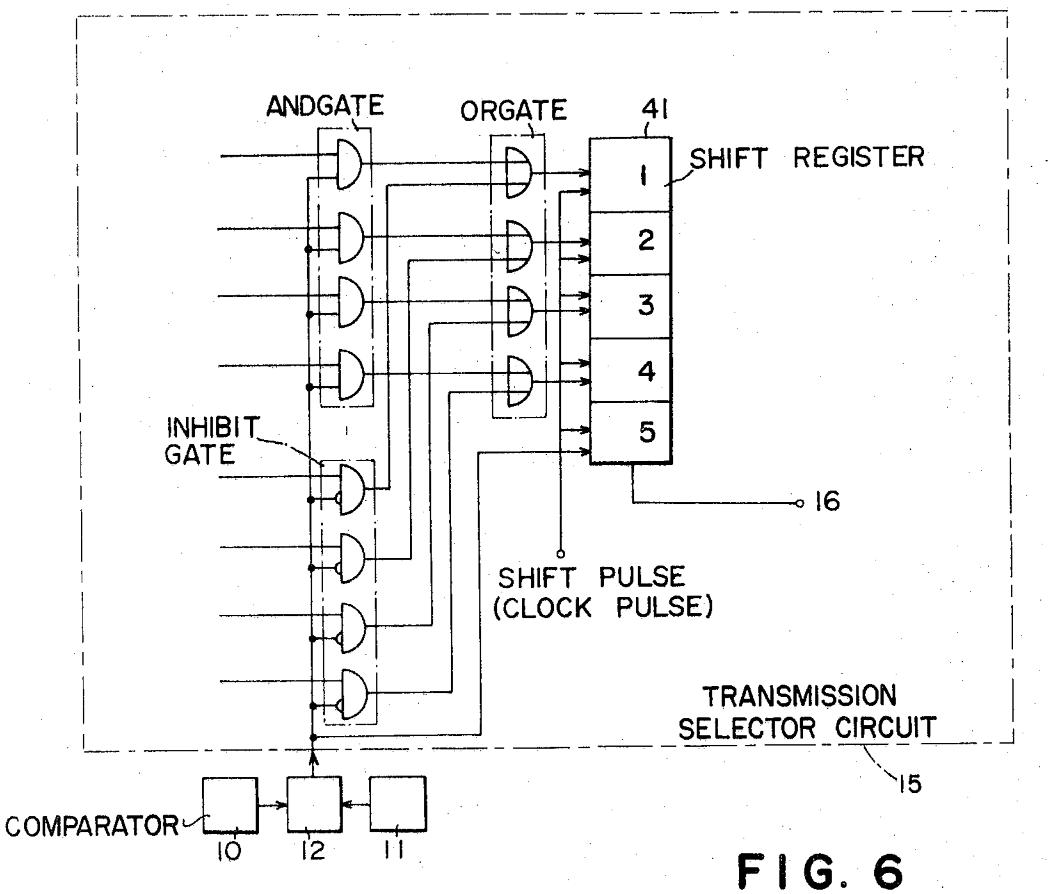
FIG. 5 is a block diagram of a transmission selector circuit of FIG. 1.

Next, a description will be given of the main circuits in the block diagram of FIG. 1. In FIG. 1, if the output signal from the coder 2, i.e. the output at the point 4, is a four-bit coded word, the transmission selector circuit 15 is constructed as depicted in FIG. 5. In FIG. 5, parts corresponding to those in FIG. 1 are identified by the same reference numerals. The output from the coder 2 is identified as 4 and that from the delay circuit 3 is identified as 5. These outputs are applied respectively through an inhibit gate and an AND gate to an OR gate and then to a shift register 41. The comparator 12 compares the outputs 4 and 5 from the coder 2 and the delay circuit 3 through the comparators 10 and 11. If the outputs from the comparators 10, 11 and 12 are taken as $C_{10}$, $C_{11}$ and $C_{12}$ respectively, the output $C_{12}$ from the comparator 12 is identified as "1" or "0". Namely, where $C_{11} \geqslant C_{10}$, $C_{12} = 1$ and where $C_{11} < C_{10}$, $C_{12} = 0$. Where $C_{12} = 1$, the AND gate is opened and its output is applied to the shift register 41 through the OR gate. The shift register 41 is a five-bit shift register, in which parallel writing is effected and, at the same time, the output $C_{12}$ is also impressed and a serial signal is derived at the output terminal 16.

Next, the comparators will be described. The comparators are identified as 10, 11 and 12 in FIG. 1. The comparators 10 and 11 are substantially identical in construction with each other but the comparator 12 is modified slightly with respect to the other comparators. For the sake of brevity, let it be assumed that the input is a four-bit parallel code.

If codes X and Y are compared with each other in a usual form, since X is of four bits, it is represented with $x_1$, $x_2$, $x_3$ and $x_4$, i.e. $x_i = 1$ or $0 (i = 1, 2, 3$ or $4)$ and Y is similarly expressed by $y_1$, $y_2$, $y_3$ and $y_4$, i.e. $y_i = 1$ or $0 (i = 1, 2, 3$ or $4)$.

Figure 6:
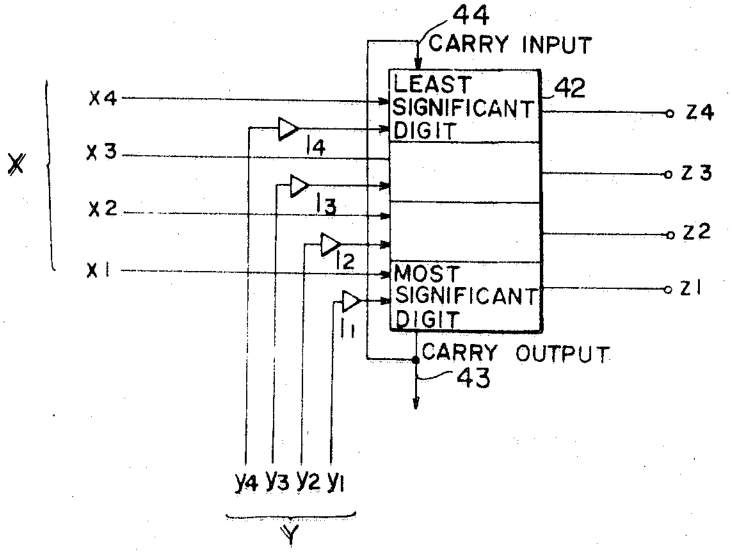
FIG. 6 is a diagram, for explaining the principle of a comparator for use in FIG. 1.
Figure 7:
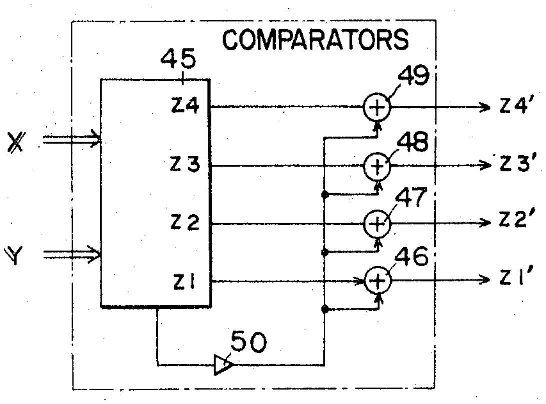
FIG. 7 is an explanatory diagram of comparators in FIG. 1.

FIG. 6 shows a circuit for the comparison of the inputs X and Y, the for providing $Z = X - Y$. In the FIG. 6, reference numeral 42 designates a four-bit adder and each input Y is fed to the adder 42 through a corresponding one of the polarity inverters $I_1$, $I_2$, $I_3$ and $I_4$. The output Z from the adder 42 includes a sign output at a terminal 43 and outputs $z_1$, $z_2$, $z_3$ and $z_4$. The sign output is 1 when $X > V$ and 0 when $X < Y$ and each output from the adder 42 is an absolute value of the difference between the inputs X and Y. One part of the output at the terminal 43 is applied as a carry input to a terminal 44. Accordingly, the comparators 10 and 11 in FIG. 1, employed in this invention, are added with exclusive-OR circuits and constructed as illustrated in FIG. 7. In FIG. 7, reference numeral 45 indicates a circuit described above with regard to FIG. 6, and 46, 47, 48 and 49 refer to exclusive-OR circuits, each of which is supplied with the sign output from a subtractor 45 through a polarity inverter 50. The exclusive-OR circuits derives outputs $z_1'$, $z_2'$, $z_3'$ and $z_4'$ at their terminals, respectively. The comparator thus constructed is used as the comparators 10 and 11. Accordingly, in FIG. 1, the outputs from the comparators 10 and 11 are dependent upon the inputs X and Y impressed thereto, that is, the inputs at their terminals 4 and 8, 5 and 9, as follows:

| | Input X | Input Y | Output |
|---|---|---|---|
| $C_{10}$ | terminal 4 | terminal 8 | $z_1'$ to $z_4'$ |
| $C_{11}$ | terminal 5 | terminal 9 | $z_1'$ to $z_4'$ |

Next, the comparator 12, i.e. its output $C_{12}$, will be described. The comparator 12 may be a circuit similar to that described in connection with FIG. 6. In this case, the inputs to the comparators 11 and 10 are used as the inputs X and Y, respectively. Accordingly, in this circuit, the absolute value of the difference between the inputs X and Y is not necessary and it is sufficient only to detect the larger input, so that only the sign output is required and it is sufficient only to apply it to the transmission selector circuit.

Figure 8:
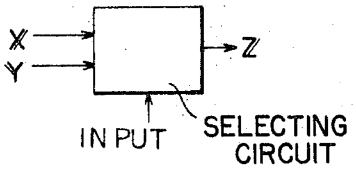
FIG. 8 is a diagram, for explaining a selecting circuit for use in FIGS. 1 and 2.
Figures 9, 10:
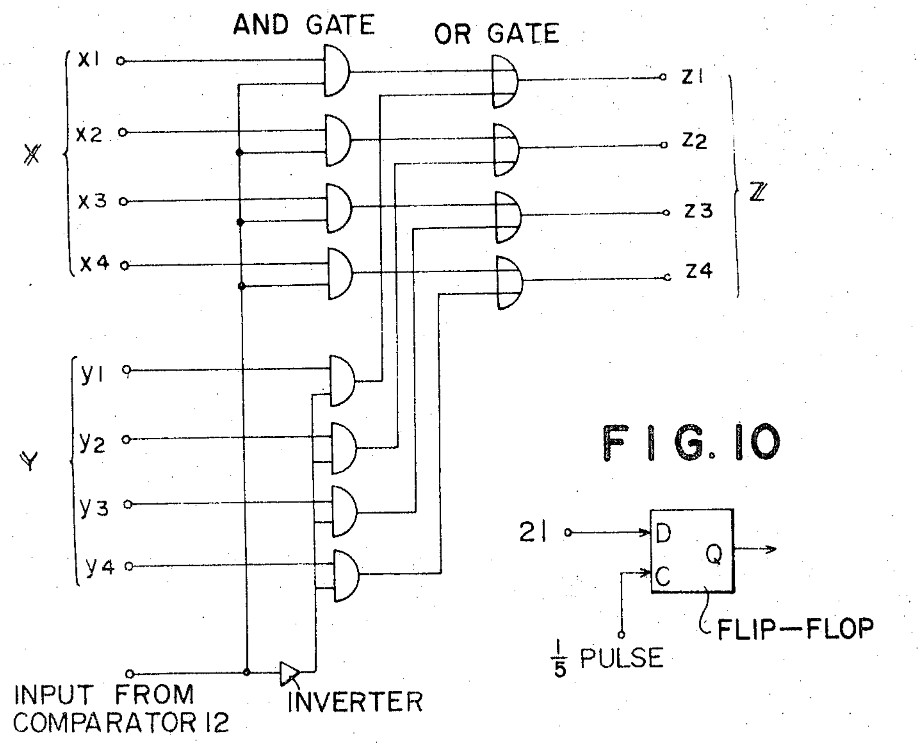
FIG. 9 is a circuit diagram showing in detail the circuit of FIG. 8.
FIG. 10 is a diagram, for explaining an address detector in FIG. 2.

The following will describe the selecting circuits 13 and 14 in FIG. 1. As depicted in FIG. 8, the selecting circuit is a circuit which is supplied with the inputs X and Y and selectively provides X or Y as the output Z in accordance with a control input, as shown in FIG. 8. Its concrete circuit construction is such as depicted in FIG. 9 and the inputs X and Y are 4-bit codes, as is the case with the foregoing. The output Z is shown with $z_1$, $z_2$, $z_3$ and $z_4$ and the input X or Y is selectively switched using the output of the comparator as a control input therefor. In the illustrated example, the control input on the side of the input Y is impressed to the AND gate through an inverter.

In FIG. 1, the coder 2 is a usual A-D converter and the delay circuit 7 is a known delay line or shift register which provides a predetermined delay. The frame memory 6 is also a known delay line or shift register, by means of which the input is delayed by the period of one frame.

Turning back to FIG. 2, the receiving side will hereinbelow be described. In FIG. 2, reference numeral 21 indicates an input terminal; 22 refers an address detector circuit; 23 identifies a frame memory; 24 relates to a delay circuit; 27 and 28 refers to selecting circuits; 29 identifies a decoder; and 30 relates to an output terminal.

In the receiving station 4 the example of FIG. 2, the input signal applied to the input terminal 21 is fed to the address detector circuit 22 to detect its address code to judge the block to which the input signal belongs, and the input signal is supplied to either one of the selecting circuits 27 and 28, in which the signal is to be rewritten. The content of the frame memory 23 thus partly rewritten is restored by the decoder 29 into the video signal, which is led to the output terminal 30.

With this method, for example, where the hatched area in FIG. 3 moves, either one of two corresponding points in the blocks I and II is stationary and the other moves and the picture element of the video signal at the moving point is transmitted to reproduce the motion. However, both of the blocks overlap in the area of large width such as the shoulder portion and follow-up operation becomes temporarily incomplete, but complete reproduction can be obtained two frames after stopping of the motion.

Figure 4:
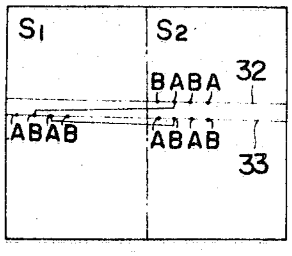

For the division of the picture into blocks and its indication, there is employed such a method as shown in FIG. 3 in which the picture is divided at its center into the left and right blocks I and II; the aforesaid selective rewriting is achieved with two points (for example, A and B) on one horizontal scanning line corresponding to each other; and the block I or II to which the rewritten signal belongs is indicated by an address signal. With this method, however, while the left-hand area of the picture, that is, the block I, is scanned, it is impossible to determine a signal to be transmitted and, after the scanning is shifted to the right-hand area, the signal to be transmitted is continuously generated. Therefore, this method is undesirable for uniform transmission. One example of its improvements is shown in FIG. 4, in which the blocks $S_1$ and $S_2$ have a checker board pattern and the time difference between two sampling points for comparison is selected to be close to one-half of the horizontal scanning period and an odd-number of times as long as the picture element interval. With this method, as shown in FIG. 4, correspondence between points A and B always exists including the case of the correspondence being between the points on two horizontal scanning lines 32 and 33. For example, each time the point B appears on the scanning line 33 in the one block $S_1$, the aforesaid selecting operation is achieved to select either the point B or the corresponding point A on the scanning line 32 in the other block $S_2$. In the next cycle, each time the point B appears on the scanning line 33 in the block $S_2$, the selecting operation is carried out to select either the point B or the corresponding point A on the scanning line 33 in the block $S_1$. Thus, the signal to be transmitted is generated at a uniform rate, which is convenient for transmission. Also in this case, the construction of the transmitting and receiving station may be the same as those in FIG. 1 and the address signal is required only to indicate the block to which the rewritten signal belongs. Further, since the time difference between the corresponding points A and B is selected to be close to one-half of the horizontal scanning period, the rewritting is achieved with the picture being divided into the blocks in a manner similar to that in the example of FIG. 3. There are some occasions when the standard of the block selection is desired to be changed in accordance with the characteristic of the picture other than that of selecting the block of larger absolute value (larger amplitude change) of the difference signal between adjacent frames. The foregoing examples have been described in connection with the case where the bandwidth is compressed about one-half by dividing the picture into two blocks, but it is also possible to obtain a higher degree of compression by dividing the picture into more blocks. For example, the picture may be divided into four blocks with vertical and lateral lines passing the center of the picture; but, in such a case, overlapping motion increases and the moving picture area is likely to become deteriorated. However, sufficiently satisfactory characteristics can be obtained in connection with particular picture with less moving picture area. Further, the fundamental principle of this invention for regularly selecting the moving picture area enables a higher degree of compression in combination with other appropriate bandwidth compression means, for example, a forecast coding system for removing spatial redundancy or the like. Moreover, this invention can be widely applied to a more adaptable compression system by the combined use of this invention system and other system in accordance with the characteristics of the picture, by switching the other compression system in terms of time and so on.

Figure 11:
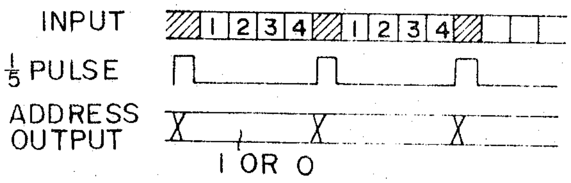
FIG. 11 is a time chart of the operation of the detector of FIG. 10.

The respective blocks in FIG. 2 will be briefly described. The address detector 22 is required only to select the code provided by the transmission selector circuit 15 of the transmitting station. Accordingly, assuming that it receives the aforesaid signal from the transmitting side, where the picture is divided into two blocks, the address is represented with a 1-bit address code (1 or 0), so that the input signal becomes 4-bit information plus 1-bit address information. Where it is read out by a delayed flip-flop such as depicted in FIG. 10, the resulting output is rendered by the 4-bit input and a sampling pulse (a 1/5 pulse) into such a form as shown in the time chart of FIG. 11. Namely, the address output is 1 or 0, from which the block of the input signal is detected.

It will be apparent that many modifications and variations may be effected without departing from the scope of the novel concepts of this invention.

We claim as our invention:

1. A picture transmission system for transmitting a video signal of compressed bandwidth over a transmission medium and for receiving and processing the transmitted video signal, said picture transmission system comprising:

A. a transmitting station including:

a. means for dividing a picture into a plurality of blocks and for regularly scanning and extracting video signals at corresponding sampling points in the respective blocks in a predetermined order, b. a first frame memory for storing video signals of one frame, c. means for comparing picture elements of the video signals from said scanning and extracting means with those at the corresponding sampling points of the video signals obtained by a preceding scanning and stored in said first frame memory and for selecting the block of the picture element of the video signal of the largest level difference, and d. means responsive to the output of said selecting means for adding the picture element of the video signal of the corresponding block with a signal indicating the block and for transmitting them to a transmission line, and B. a receiving station including:

a. a second frame memory for storing transmitted video signals of one frame, and b. detecting means for detecting the block indicating signal added to the picture element of the video signal transmitted and for converting a picture element of the video signal in the block of a picture in said second frame memory corresponding to the block indicating signal into the picture element of the transmitted video signal.

2. A picture transmission system according to claim 1, wherein said scanning and extracting means divides the picture to be trans mitted into two bilateral blocks.

3. A picture transmission system according to claim 2, wherein in said transmitting station, said scanning and extracting means includes a first delay circuit having a delay time corresponding to one-half of one horizontal scanning period, and transmission selecting means responsive to video signals appearing at input and output ends of said first delay circuit for switching them with a comparison signal and for sending out either one of them together with a discriminating signal; said first frame memory having a second delay circuit of a delay time corresponding to one-half of the horizontal scanning period, connected between its output and input sides with the video signals appearing at the input end of said first delay circuit and a second gate circuit supplied with the video signal appearing at the output end of said first delay circuit; a first comparator circuit for comparing the video signal level at the input end of said first delay circuit with that at the input end of said first gate circuit to provide a difference signal therebetween; a second comparator circuit for comparing the video signal level at the output end of said first delay circuit with that at the input end of said second gate circuit to provide a difference signal therebetween; and a third comparator circuit for comparing the difference signals derived from said first and second comparator circuits to provide a compared output.

4. A picture transmission system according to claim

1, wherein in said transmitting station, said scanning and extracting means includes a first delay circuit imparting a delay corresponding to one-half of one horizontal scanning period, and transmission selecting means responsive to video signals appearing at the input and output of said first delay circuit for switching them with a comparison signal and for sending at least one of these signals together with a discriminating signal.

5. A picture transmission system according to claim 4, wherein in said transmitting station, said first frame memory comprises a second delay circuit imparting a delay time corresponding to one-half of the horizontal scanning period and having connected between its input and output terminals a first gate circuit, said first gate circuit supplied at its output and input sides with video signals appearing at the input end of said first delay circuit, and a second gate circuit supplied with the video signal appearing at the output end of said first delay circuit.

6. A picture transmission system according to claim 5, wherein in said transmitting station, there is further included a first comparator circuit for comparing the video signal level at the input end of said first delay circuit with that appearing at the input end of said first gate circuit to provide a first difference signal; a second comparator circuit for comparing the video signal level appearing at the output end of said first delay circuit with that signal appearing at the input end of said second gate circuit to provide a second difference signal; and a third comparator circuit for comparing the first and second difference signals to provide a compared output.

7. A picture transmission system according to claim 1, wherein in said receiving station, said detecting means includes an address detector for detecting the transmitted block indicating signal added to the picture element of the video signal, first and second selecting circuits, each responsive to the output of said address detector, and a delay circuit interconnected between said first and second selecting circuits.

8. A picture transmission system according to claim 7, wherein in said receiving station, said frame memory is responsive to the output appearing at said second selecting circuit for providing an input to said first selecting circuit.

* * * * *